G. T. LEACH.
Car Brake.

No. 11,937.

2 Sheets—Sheet 1.

Patented Nov. 14, 1854.

G. T. LEACH.
Car Brake.
No. 11,937.
2 Sheets—Sheet 2.
Patented Nov. 14, 1854.
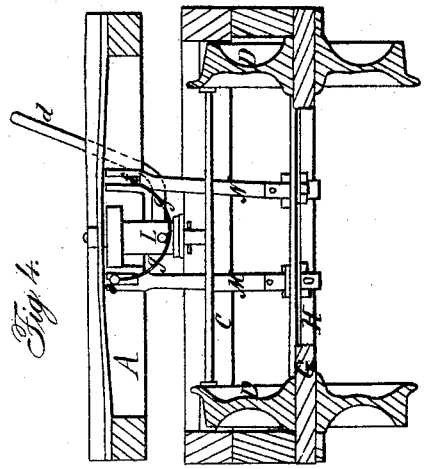
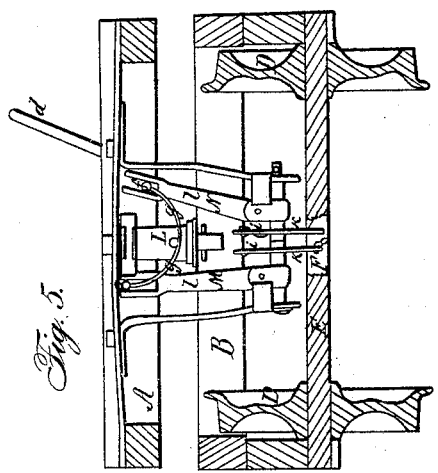
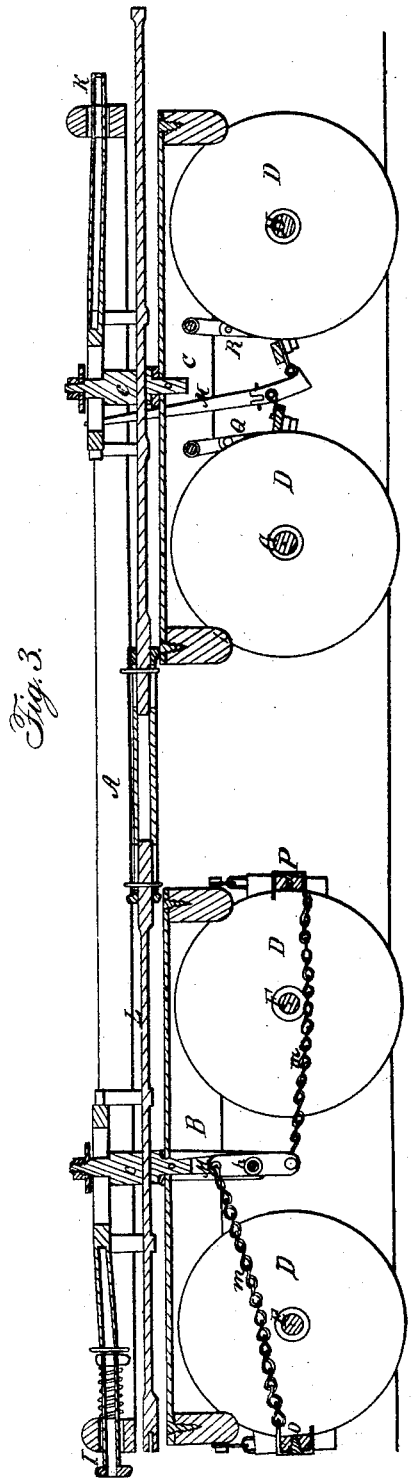

UNITED STATES PATENT OFFICE.

GEORGE T. LEACH, OF BOSTON, MASSACHUSETTS.

METHOD OF ENGAGING AND DISENGAGING SELF-ACTING CAR-BRAKES.

Specification of Letters Patent No. 11,937, dated November 14, 1854.

*To all whom it may concern:*

Be it known that I, GEORGE T. LEACH, of Boston, in the county of Suffolk and State of Massachusetts, have invented an Improvement in Mechanism for Operating Railway-Car Brakes; and I do hereby declare that the same is fully described and represented in the following specification and the accompanying drawings, letters, figures, and references thereof.

Figure 1:
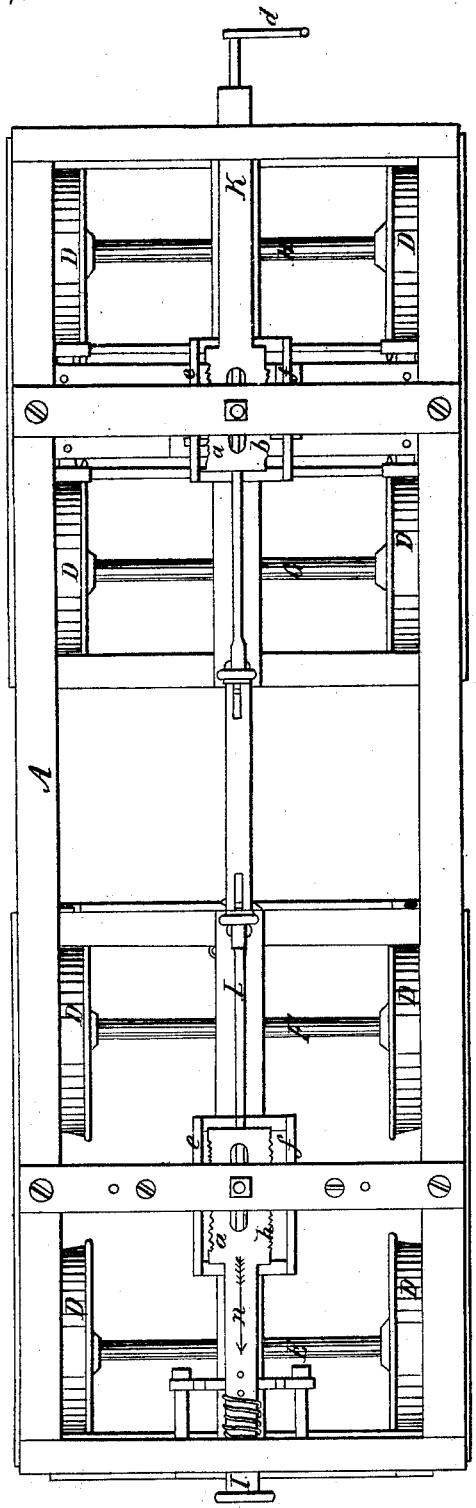
Figure 2:
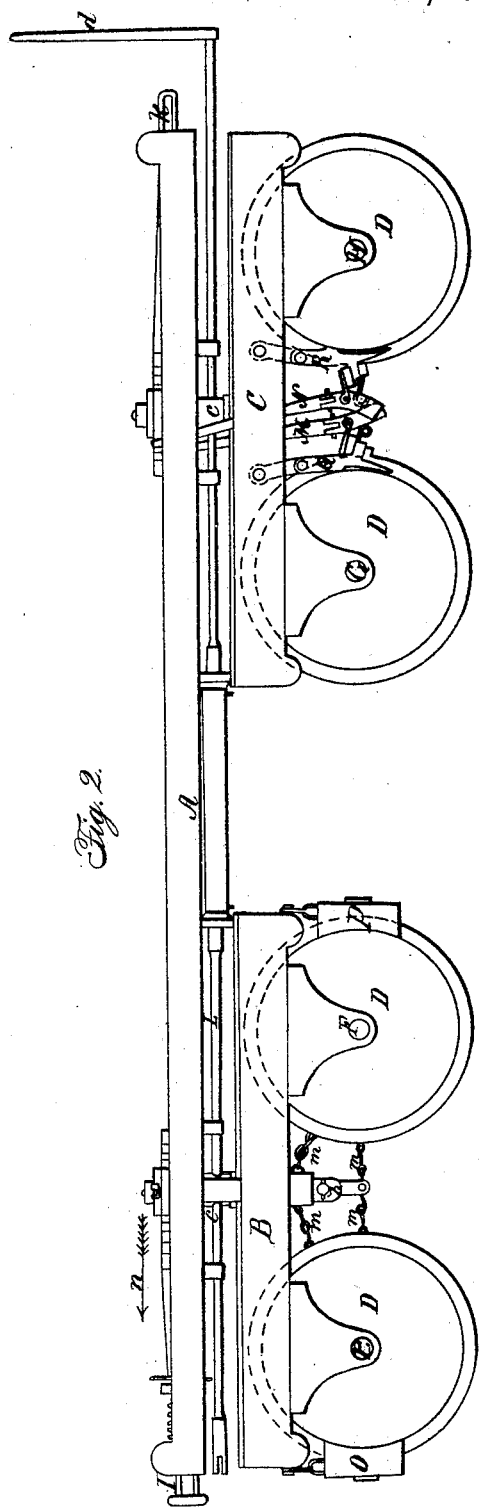

Of the said drawings Figure 1 represents a top view of a railway car platform frame and its two truck frames as fitted up with my improvement. Fig. 2 is a side elevation of the same. Fig. 3 is a vertical, central and longitudinal section thereof. Fig. 4 is a transverse and vertical section taken through the forward axle of the back truck. Fig. 5 is a transverse and vertical section taken through the forward axle of the back truck.

In these drawings A denotes the platform frame; B, the forward truck frame, and C, the rear truck-frame, each of said truck frames being supported on four trucks or wheels D, D, D, D, in the usual way—their axles being represented at E, F, G, H. The front and rear bunter bars are shown at I, K. Each of them is supported so as to be capable of sliding forward and backward in a longitudinal direction and has attached to opposite sides of it are two racks $a$, $b$. Under these bunter bars and extending from one end of the platform frame to the other and supported in bearings $c$, $c$. As seen in Fig. 3, is a long rocker shaft L, which is turned transversely by means of a lever $d$. In connection with this rocker shaft are four lever workers $e, f, e, f,$ two of which are applied on opposite sides of each of the bunter bars. These lever workers are respectively composed of metallic bars or rods arranged parallel to the rocker shaft L, and somewhat above it, and connected to it by curved arms, $g$, $g$, as seen in Figs. 4 and 5. The two lever workers of each set respectively operate two jointed pawl levers, M, N, the upper ends of said pawl levers being bifurcated for the purpose of receiving the lever workers as seen in Figs. 4, and 5. The two forward pawl levers turn on a common fulcrum or pin $h$, and each of them in case the brakes are applied outside of the wheels of the truck is provided with three arms, $i, k, l,$ two of which, viz., $i, k,$ extend in opposite directions from the fulcrum while the third arm, $l$, is so jointed to them as to be capable of being moved either toward or away from its rack, $a$, or $b$, of the adjacent bunter bar. When the brakes are placed between the two sets of wheels as they are shown in the drawings of the rear truck frames each of the pawl levers is somewhat differently constructed or has but two arms, the upper of which is provided with a joint above its fulcrum in order to permit the superior part of the arm to be moved either toward or away from its adjacent rack as occasion may require. Each of these pawl levers should be so connected to two sets of brakes O, P, Q, R, of its truck frame as to cause it when moved in one direction to draw or force the brakes against the periphery of the wheel, while when it is moved in the other direction it will relieve the said brakes from the pressure on their wheels. By turning the rocker shaft, L, in either direction, we move one rocker lever up to and into engagement with its rack and the other rocker lever out of engagement with its rack.

In the drawings, the forward truck brakes are represented as connected with the pawl levers by chains $m$, $m$, each brake bar being connected to the upper short arm of one lever and the lower short arm of the other lever. When the brakes are placed between the wheels as they are in the rear truck, the pawl levers are to be so applied to them as to move them in contact with their wheels when the said pawl levers are moved in one direction.

We will now suppose the car in a train and to be drawn forward or in the direction to be shown by the arrow, $n$, its forward bunter bar at this time will of course be drawn forward and its rear bunter bar pulled backward provided another car is in the rear of it. Under this state of things if we turn the rocker shaft, L, so as to move the jointed pawl levers M, M, into contact with their racks and we diminish the speed of the engine, the momentum of the cars of the train will bring them together so as to force the bunter bars inward and cause their racks in contact with the pawl levers, to move said pawl levers so as to throw the brakes into action upon the wheels. Should we desire to arrest the motion of the train while it is being backed we have only to move the rocker shaft in a contrary direction so as to bring the pawl levers N, N, into contact with racks. As soon as the speed of the engine is diminished, the bunter bars will be drawn outward and the brakes be put in action on their wheel. Thus by means of the mechanism as above described I am enabled to operate the brakes or throw them into action on their wheels during either the forward or back movement of a train of cars.

I do not claim operating the brakes by means of the back movement of a bunter slide, but What I do claim is—

The combination of the two jointed pawl levers M, N, the rocker shaft L, and its lever workers, e, f, and the two racks, a, b, as arranged and applied to the bunter bar, I, or K, and the brakes and made to operate substantially as specified.

In testimony whereof I have hereunto set my signature this twentieth day of September A. D. 1854.

GEORGE T. LEACH.

Winesses:
R. H. EDDY,
F. P. HALE, Jr.